(12) United States Patent
Kim et al.

(10) Patent No.: US 12,084,362 B2
(45) Date of Patent: Sep. 10, 2024

(54) APPARATUS FOR GENERATING CHLORINE DISINFECTANT

(71) Applicants: Jeong Nam Kim, Seoul (KR); Jun Hwan Choi, Seoul (KR)

(72) Inventors: Jeong Nam Kim, Seoul (KR); Jun Hwan Choi, Seoul (KR)

( * ) Notice: Subject to any disclaimer, the term of this patent is extended or adjusted under 35 U.S.C. 154(b) by 478 days.

(21) Appl. No.: 17/432,427

(22) PCT Filed: Feb. 17, 2020

(86) PCT No.: PCT/KR2020/002250
§ 371 (c)(1),
(2) Date: Aug. 19, 2021

(87) PCT Pub. No.: WO2020/171515
PCT Pub. Date: Aug. 27, 2020

(65) Prior Publication Data
US 2022/0194822 A1 Jun. 23, 2022

(30) Foreign Application Priority Data
Feb. 19, 2019 (KR) .................. 10-2019-0019250

(51) Int. Cl.
C02F 1/461 (2023.01)
C02F 1/00 (2023.01)
C02F 1/467 (2023.01)

(52) U.S. Cl.
CPC ........... *C02F 1/46104* (2013.01); *C02F 1/001* (2013.01); *C02F 1/008* (2013.01); *C02F 1/4674* (2013.01); *C02F 2201/4614* (2013.01); *C02F 2201/4618* (2013.01); *C02F 2209/02* (2013.01); *C02F 2209/42* (2013.01); *C02F 2303/04* (2013.01); *C02F 2303/14* (2013.01)

(58) Field of Classification Search
CPC ............ C02F 1/46104; C02F 2201/461; C02F 2201/46105; C02F 1/461; C02F 1/4674
See application file for complete search history.

(56) References Cited

FOREIGN PATENT DOCUMENTS

| KR | 10-0964878 B1 | 6/2010 | |
|---|---|---|---|
| KR | 10-981585 B1 | 9/2010 | |
| KR | 10-1270520 B1 | 6/2013 | |
| KR | 10-1313698 B1 | 10/2013 | |
| KR | 101873940 B1 * | 8/2018 | ............ C02F 1/4674 |
| KR | 10-1941375 B1 | 1/2019 | |
| WO | WO-0238507 A1 * | 5/2002 | .............. C02F 1/008 |

* cited by examiner

*Primary Examiner* — Nicholas A Smith

(57) ABSTRACT

The present invention relates to an apparatus for generating chlorine disinfectant that arranges, a salt water supply part, a hypochlorite generation part, a control part.

19 Claims, 4 Drawing Sheets

[FIG 1]

<PRIOR ART>

APPARATUS FOR GENERATING CHLORINE DISINFECTANT

This application is a national stage application, filed under 35 U.S.C. § 371, of International Patent Application No. PCT/KR2020/002250, filed on Feb. 17, 2020, which claims the priority of Korean application No. 10-2019-0019250, filed Feb. 19, 2019, the contents of which are incorporated by reference.

TECHNICAL FIELD

The present invention relates to a salt water supply structure of an apparatus for generating chlorine disinfectant, and more particularly to an apparatus for generating chlorine disinfectant, by which the apparatus may be manufactured to be smaller and lighter by providing a saturated salt collection part and a diluted water supply part in one side space separated and partitioned from a dissolution tank, forming the saturated salt collection party at a lower portion of the dissolution tank to be connected to a bottom of the dissolution tank, and forming the diluted water supply part at an upper portion of the saturated salt collection part such that the diluted water supply part is separated and partitioned.

BACKGROUND ART

In general, sodium hypochlorite (NaOCl) is a transparent liquid chlorine-based antiseptic agent having a strong chlorine order and having no color that is used for water purification facilities, sterilizing apparatuses of sewage treatment facilities, boilers of cooling water of general chemical factories, treatment water for desalination processes, treatment of cooling water of power plants, treatment of drinking water, treatment of plants, vegetables, and meat, washing of pools, making papers, and domestic bleaching agents.

The non-partition type apparatus for generating sodium, which is used to generate sodium hypochlorite electrolyzes salt in diluted salt water by using DC voltages applied to two electrodes in a process of depositing a large amount of salt in incoming water of a specific amount and a specific pressure and water and maintaining the solution for eight to eight to twenty hours, mixing the saturated salt water of a specific amount and a specific pressure saturated after salt of 28 to 30% is fused, through a pump or the like, and causing diluted salt water having a salinity of 2.8 to 3.0% to pass through an electrolysis tank having a series of electrodes (a positive electrode and a negative electrode) having no separator (ion exchange membrane).

That is, the diluted salt water of 2.8 to 3.0% introduced into the electrolysis apparatus is divided into sodium ions ($Na^+$) and chloride ions ($Cl^-$), the chloride ions are oxidized in the positive electrode to become chlorine (Equation 1), the sodium ions are reduced in the negative electrode to becomes sodium (Equation 2), the generated sodium reacts with water to be converted into sodium hydroxide (caustic soda) (NaOH) and hydrogen (Equation 3), and the chlorine generated in the positive electrode and the sodium hydroxide react with each other to generate sodium hypochlorite (NaOCl) (Equation 4).

$$Cl^- \rightarrow Cl_2 + e^-$$ (Equation 1)

$$Na^+ + e^- \rightarrow Na$$ (Equation 2)

$$Na + H_2O \rightarrow NaOH + H_2$$ (Equation 3)

$$NaOH + Cl2 \rightarrow NaOCl + HCl$$ (Equation 4)

The sodium hypochlorite generated as described above is used for chlorine sterilization or as an oxidizer in the field that requires sterilization or oxidation in a safe form of salt water, a production rate and a concentration of sodium hypochlorite follows the law of Faraday, and the production rate and the concentration of the sodium hypochlorite are determined according to the diluted salt water in which the supplied incoming water and the salt water are mixed.

Figure 1:
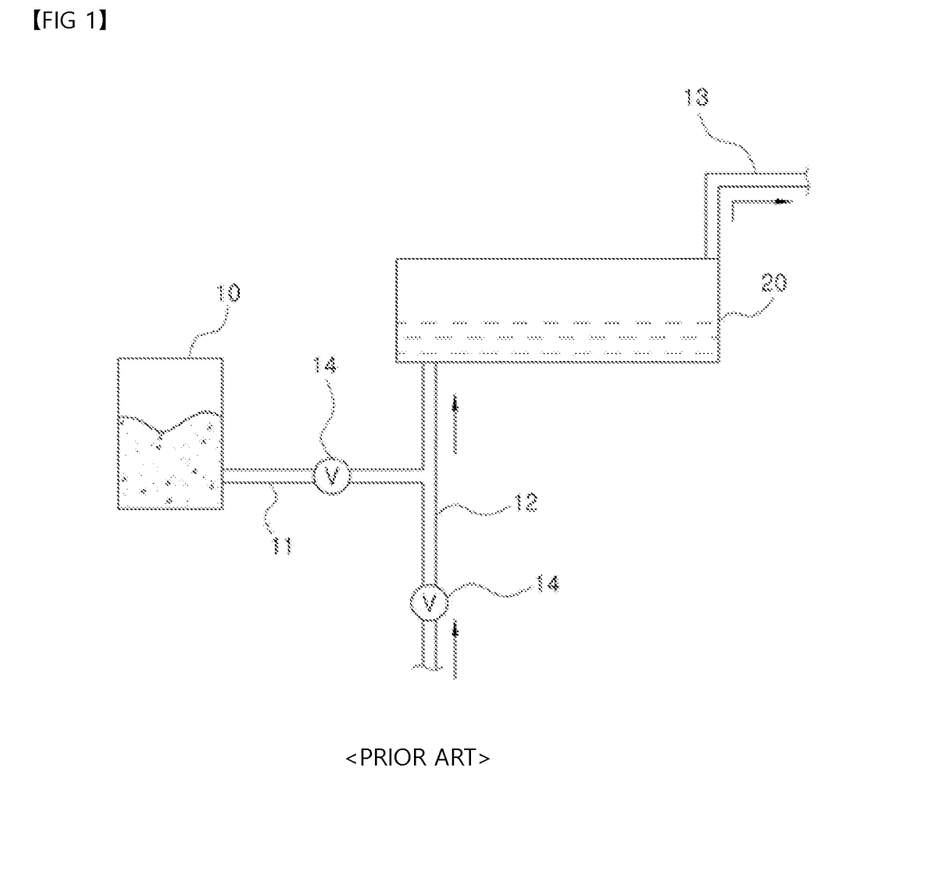
FIG. 1 is a diagram of a conventional non-partition type apparatus for generating sodium hypochlorite.

FIG. 1 schematically illustrates a configuration of an apparatus for generating sodium hypochlorite according to a conventional technology. The apparatus for generating sodium hypochlorite, as illustrated in FIG. 1, includes a salt water storage tank 10, in which salt is deposited in water, and an electrolysis tank 20 having a series of electrodes (a positive electrode and a negative electrode), and a salt water supply pipe 11 that supplies salt water to the electrolysis tank 20 is connected between the salt water storage tank 10 and the electrolysis tank 20.

Furthermore, an incoming water supply pipe 12 that supplies the incoming water is connected to one side of the salt water supply pipe 11 to be communicated with the salt water supply pipe 11 to function to supply the salt water in the salt water supply tank 10 after partially diluting the salt water when the salt water flows to the electrolysis tank 20. A flow meter 14 and a flow rate control valve (not illustrated) are mounted on the salt water supply pipe 11 and the incoming water supply pipe 12.

In the above-configured apparatus for generating sodium hypochlorite, when the salt water is supplied from the salt water storage tank 1—through the salt water supply pipe 11 and the incoming water is supplied through the incoming water supply pipe 12 at the same time, the salt water is partially diluted by the incoming water, and the diluted salt water (the salt water 1, and the incoming water 10) flows to the electrolysis tank 20.

Then, in a process of causing the diluted salt water to pass through the electrolysis tank 20 having the series of electrodes (the positive electrode and the negative electrode), the diluted salt water is electrolyzed and recoupled by the DC voltages applied to the electrodes to be converted into sodium hypochlorite of a suitable effective chlorine concentration, and is discharged through a sodium hypochlorite discharge pipe 13 connected to and installed at an upper end of the electrolysis tank and is stored at a specific site.

The sodium hypochlorite stored at the specific site is mixed with water at a specific rate according to a desired amount of chlorine at a use site when being used.

However, the above-structured apparatus for generating sodium hypochlorite employs a scheme of adjusting a flow rate and a pressure of the incoming water by installing an electric opening/closing valve, a pressure-reducing valve, or a flow rate control valve in a pipeline that is branched from a faucet pipe or a pipeline, in which an existing water pressure is formed, and inserted into the electrolysis tank. However, in this case, a pressure in the pipeline is changed, the flow rate and the pressure of the incoming water introduced into the electrolysis tank are also changed, and thus, the concentration and the production rate of the sodium hypochlorite generated in the electrolysis tank become different. Furthermore, when the flow rate rapidly decreases, the electrolysis apparatus is heated and damaged due to overheating, and when a blackout occurs during an operation of the electrolysis, the incoming water continues to be supplied to the electrolysis apparatus that is not operated as the opened electric opening/closing valve is not closed. Accordingly, the concentration of the sodium hypochlorite produced in advance and stored in the storage tank becomes lower or the storage tank is flooded.

Furthermore, only one flow rate control valve and a solenoid type electric valve connected in series to each other are installed between an outlet of the incoming water supply pump and a pipeline of a use site to obtain chlorine disinfectant of a desired concentration in correspondence of a target of a cleaned object by diluting a specific amount of incoming water in the sodium hypochlorite discharged from the electrolysis tank. Accordingly, there is an inconvenience of having to directly adjust the flow rate control valve according to a use purpose of the antiseptic agent.

Furthermore, when a sodium hypochlorite discharge hole of the electrolysis tank is connected to a separate sodium hypochlorite storage tank, a sodium hypochlorite supply pump is separately installed between the sodium hypochlorite storage tank and the use site of the antiseptic agent. Accordingly, there is an inconvenience of adjusting an amount of the sodium hypochlorite in correspondence to an amount and a pressure of the introduced incoming water, production costs of the products increase due to installation of the separate sodium hypochlorite storage tank and the separate pump.

(Patent document 1) Korean Patent No. 10-0964878 (registration date: Jun. 11, 2010)

DISCLOSURE

Technical Problem

In order to solve the above-problems of the conventional technology, an objective of the present invention is to provide a salt water supply structure of an apparatus for generating chlorine disinfectant, which has an improved electrolysis efficiency by stably supplying salt water of a high quality to an electrolysis tank through a salt water supply part.

Another objective of the present invention is to provide a salt water supply structure of an apparatus for generating chlorine disinfectant, by which a large amount of the saturated salt may be supplied more stably by installing a separate saturated salt collecting part in the salt water supply part, and thus an antiseptic solution operation time and a work capacity may be improved.

Another objective of the present invention is to provide an apparatus for generating chlorine disinfectant, by which the apparatus may be manufactured to be smaller and lighter by providing a saturated salt collection part and a diluted water supply part in one side space separated and partitioned from a dissolution tank, forming the saturated salt collection party at a lower portion of the dissolution tank to be connected to a bottom of the dissolution tank, and forming the diluted water supply part at an upper portion of the saturated salt collection part such that the diluted water supply part is separated and partitioned.

Another objective of the present invention is to prevent salt from being stuck to a wall surface of a dissolution tank by forming an incoming water ejection nozzle that ejects incoming water at an upper portion of the dissolution tank and making an ejection direction of the incoming water ejection nozzle toward an inner wall surface of an upper portion of the dissolution tank such when the incoming water is ejected.

Another objective of the present invention is to allow a user to prepare for a danger of freezing and rupture, by installing a temperature sensor at an inlet of a salt water supply part, through which incoming water is supplied, informing a CPU of a measured value obtained by measuring a temperature of the incoming water with the temperature sensor, determining that there is a danger of freezing and rupture with the CPU when the measured value is a preset value or less, and generating a warning alarm.

Another objective of the present invention is to maintain a quality of sterilizing water constant by allowing a CPU to determine a value of a temperature sensor and controlling a supply current of an electrolysis tank through a current control part such that an electrolysis temperature of a hypochlorite generation part is always maintained at a reference value.

Another objective of the present invention is to maintain a supply amount of a solution constant by controlling a first pump and a second pump with a CPU to control a mixing ratio of saturated salt water and diluted water.

Another objective of the present invention is to always normally perform a water level adjusting function by forming a cleaning water ejection nozzle for removing salt components in a salt water level switch.

Another objective of the present invention is to smoothly resume an operation of an apparatus when the apparatus is reused, by a pressure releasing means for releasing a pressure of a chlorine disinfectant supply line at a distal end of a dilution part.

Technical Solution

An aspect of the present invention provides an apparatus for generating chlorine disinfectant, in which a salt water supply part that generates diluted salt water by mixing incoming water at a specific ratio in a pipeline, to which saturated salt water is supplied, a hypochlorite generation part that generates sodium hypochlorite by receiving and electrolyzing the diluted salt water, and generate chlorine disinfectant by mixing the sodium hypochlorite with the incoming water at a desired ratio, and a control part that controls the salt water supply part and the hypochlorite generation part are disposed in a single body case, wherein the salt water supply part has a dissolution tank and includes a saturated salt collection part and a diluted water supply part in a space on a side that is separated and partitioned from the dissolution tank, the saturated salt collection part is formed at a lower portion thereof to be connected to a bottom of the dissolution tank, and the diluted water supply part is formed at a saturated salt collection part to be separated and partitioned therefrom.

Advantageous Effects

The present invention may improve an electrolysis efficiency by stably supplying salt water of a high quality to the electrolysis tank through the salt water supply part.

Furthermore, according to the present invention, a large amount of the saturated salt may be supplied more stably by installing a separate saturated slat collecting part in the salt water supply part, and thus an antiseptic solution operation time and a work capacity may be improved.

Furthermore, the apparatus may be manufactured to be smaller and lighter by providing a saturated salt collection part and a diluted water supply part in one side space separated and partitioned from a dissolution tank, forming the saturated salt collection party at a lower portion of the dissolution tank to be connected to a bottom of the dissolution tank, and forming the diluted water supply part at an upper portion of the saturated salt collection part such that the diluted water supply part is separated and partitioned, and manufacturing costs may be reduced and management and transportation of the apparatus become convenient.

Furthermore, the present invention may prevent salt from being stuck to a wall surface of a dissolution tank by forming an incoming water ejection nozzle that ejects incoming water at an upper portion of the dissolution tank and making an ejection direction of the incoming water ejection nozzle toward an inner wall surface of an upper portion of the dissolution tank such when the incoming water is ejected, and a uniform salt water concentration may be maintained and thus sterilizing water of a uniform quality may be generated.

Furthermore, the present invention may prevent salt from being stuck to a wall surface of a dissolution tank whereby breakdowns and corrosion of the apparatus may be prevented in advance as salt overflows to the outside of the dissolution tank or salt is left in an interior of the apparatus or in internal components.

Furthermore, the present invention may allow a user to prepare for a danger of freezing and rupture, by installing a temperature sensor at an inlet of a salt water supply part, through which incoming water is supplied, informing a CPU of a measured value obtained by measuring a temperature of the incoming water with the temperature sensor, determining that there is a danger of freezing and rupture with the CPU when the measured value is a preset value or less, and generating a warning alarm whereby the apparatus may be prevented from breaking down.

Furthermore, the quality of the sterilizing water may be constantly maintained by determining a value of a temperature sensor with a CPU to control a supply current of an electrolysis tank through a current control part such that an electrolysis temperature of a hypochlorite generation part is always maintained at a reference value, a problem of a rise in a temperature of incoming water due to a change in a temperature of the incoming water for seasons and global warming may be prevented, and a concentration of the sterilizing water may be constantly maintained to provide the sterilizing water of a uniform quality and a concentration of the sterilizing water may be constantly maintained to provide the sterilizing water of a uniform quality, by constantly maintaining a reaction temperature in the electrolysis tank and a change in an amount of electrolysis currents and thus preventing a breakdown problem of a power supply apparatus due to an overcurrent.

Furthermore, the present invention may adjust a mixing ratio of the saturated salt water and the diluted water by controlling a first pump and a second pump with a CPU whereby a change in a supply amount of a solution and a change in a concentration of an electrolyte and a concentration of sterilizing water due to a change in a pressure of a discharge side of a salt water supply apparatus and a solution diluted water supply apparatus may be constantly maintained by constantly maintaining a supply amount of the solution.

Furthermore, the present invention may be conveniently used by forming a cleaning water ejection nozzle for removing salt in a salt water level switch to always normally perform a water level adjusting function.

Furthermore, the present invention may be conveniently used by forming a pressure releasing means for releasing a pressure of a chlorine disinfectant supply line at a distal end of a dilution part to smoothly resume an operation of the apparatus when the apparatus is reused.

BEST MODE

Hereinafter, embodiments of the present invention will be described in detail with reference to the accompanying drawings.

Figure 2:
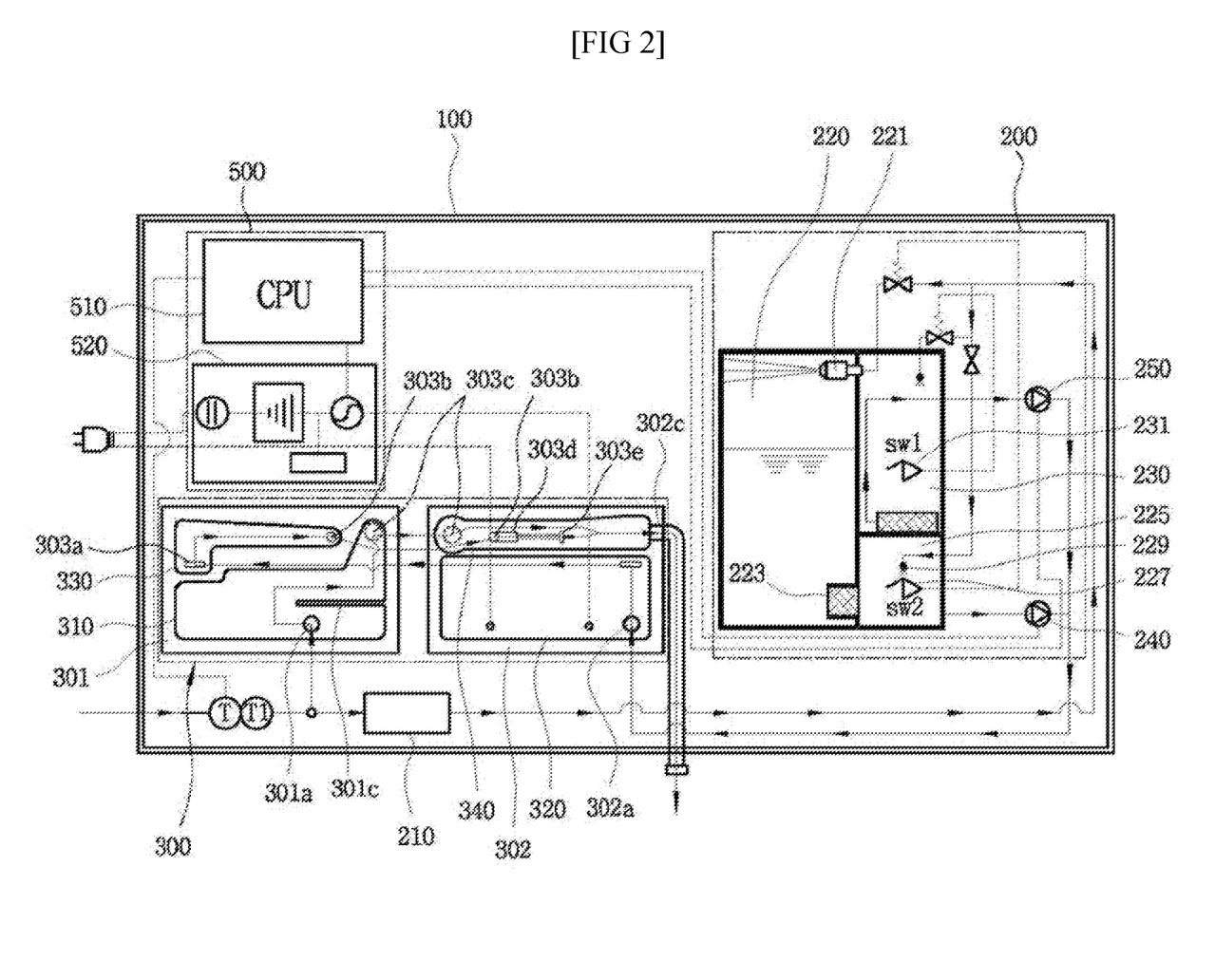
FIG. 2 is a schematic diagram of an apparatus for generating chlorine disinfectant according to the present invention.

FIG. 2 is a schematic diagram of an apparatus for generating chlorine disinfectant according to the present invention.

Referring to FIG. 2, an apparatus for generating chlorine disinfectant, in which a salt water supply part 200 that generates diluted salt water by mixing incoming water at a specific ratio in a pipeline, to which saturated salt water is supplied, a hypochlorite generation part 300 that generates sodium hypochlorite by receiving and electrolyzing the diluted salt water, and generate chlorine disinfectant by mixing the sodium hypochlorite with the incoming water at a desired ratio, and a control part 500 that controls the salt water supply part 200 and the hypochlorite generation part 300 are disposed in a single body case 100 is disclosed.

The salt water supply part 200 has a dissolution tank 220 and includes a saturated salt collection part 225 and a dilution water supply part 230 in a space on a side that is separated and partitioned from the dissolution tank 220, the saturated salt collection part 225 is formed at a lower portion thereof to be connected to a bottom of the dissolution tank 220, and the dilution water supply part 230 is formed at a saturated salt collection part 225 to be separated and partitioned therefrom.

In the salt water supply part 200, the dissolution tank 220, the saturated salt collection part 225, and the diluted water supply part 230 are integrally formed in a single case, and in this way, when the saturated salt collection part 225, and the diluted water supply part 230 are integrally formed in the integral case, the apparatus may be manufactured to be smaller and lighter, and manufacturing costs may be reduced through simplification of a manufacturing process and an assembly process.

Furthermore, it becomes easier to manage or carry the apparatus through miniaturization of the apparatus.

An incoming water ejection nozzle 221 that ejects incoming water is formed at an upper portion of the dissolution tank 220. Then, the incoming water is allowed to be ejected to an inner wall surface of an upper portion of the dissolution tank 220 to flow downwards along the wall surface by causing a nozzle direction of the incoming water ejection nozzle 221 to face an inner wall surface of an upper portion of the dissolution tank 220.

Furthermore, it is preferable that the incoming water is ejected to wall surfaces of four sides by making an ejection angle of the incoming water ejection nozzle 221 larger.

Referring to FIG. 2, it is illustrated as an example that the incoming water ejection nozzle 221 is installed to eject the incoming water from a left wall surface toward a right wall surface, but the present invention is not limited thereto, and a wide-angle ejection scheme or a 4-side ejection nozzle may be made such that the incoming water ejected from a center of an upper portion thereof strikes front, rear, left, and right surfaces of the dissolution tank 220.

The present invention functions to prevent salt crystals from being stuck to a wall surface of a dissolution tank while the incoming water ejection nozzle 221 supplies the incoming water.

This makes it possible to constantly maintain a quality of the finally generated sterilized water by uniformly adjusting a concentration of the salt water in the dissolution tank 220.

Furthermore, the present invention is advantageous in maintenance and repair because salt is prevented from being stuck to a wall surface of the dissolution tank 220. For example, due to redundancy of the salt to the outside of the dissolution tank 220, the salt may be distributed in an interior of the apparatus or in internal components and the apparatus may break down or be variously corroded, and the problem may be prevented in advance.

Then, in the dissolution tank 220, saturated a lot having a concentration of 28 to 30% is generated as the salt is dissolved in a specific amount of water.

Furthermore, a filter 223 may be formed at an inlet of the saturated salt collection part 225 on a bottom of the dissolution tank 220.

For example, the salt water dissolved in the dissolution tank 220 flows to the saturated salt collection part 225, and the filter 223 is installed on a flow path thereof to filter out foreign substances.

Furthermore, a salt water level switch 227 is formed in the saturated salt collection part 225.

Then, the salt water level switch 227 is installed at an upper portion of the saturated salt collection part 225, a decrease in a level of saturated salt is detected such that supply of the incoming water is controlled.

The salt water level switch 227 may employ a floating scheme, and in this case, salt crystals are attached to a rotation part and the rotation part may not be operated. Accordingly, in the present invention, in preparation for the case, a cleaning water ejection nozzle 229 for removing salt components may be formed in the salt water level switch 227.

The cleaning water ejection nozzle 229 removes the salt crystals stuck to the salt water level switch 227 by ejecting water intermittently or periodically, and then, it is preferable that an amount of the ejected water is controlled to a level, at which the concentration of the whole saturated salt, that is, a quality of the finally generated sterilized water is not influenced by the amount of the ejected water.

Then, the saturated salt water in the saturated salt collection part 225 feeds the saturated salt water to the hypochlorite generation part 300 through a first pump 240.

Furthermore, a diluted water level switch 231 is also formed in the diluted water supply part 230 provided at an upper portion of the saturated salt collection part 225, and detects a decrease in the water level and controls supply of the incoming water.

Then, the diluted salt water in the diluted salt supply part 230 is fed to the hypochlorite generation part 300 through a second pump 250.

Here, the saturated salt water fed by the first pump 240 and the diluted water fed by the second pump 250 merge in one pipeline and are supplied to the hypochlorite generation part 300, and feeding amounts of the first pump 240 and the second pump 250 are controlled respectively such that the salt water diluted at a ratio of 2.8 to 3.0% is supplied to the hypochlorite generation part 300.

Furthermore, a pipeline that is directly connected from the salt water supply part 200 to the hypochlorite generation part 300 is installed in the interior of the case 100, and a bypass part 210 that guides a portion of the pipeline on an outer side of the case 100 to arbitrarily connect or interrupt a middle part of the pipeline exposed to an outside of the case 100.

The bypass part 210 functions as a pipeline that supplies the diluted salt water when an antiseptic solution is used, and may function as a drain passage or the like, through which the salt water in the salt water supply part is discharged to the outside, by separating the pipeline when the antiseptic solution generating apparatus is not used for a long time after being used.

Figure 3:
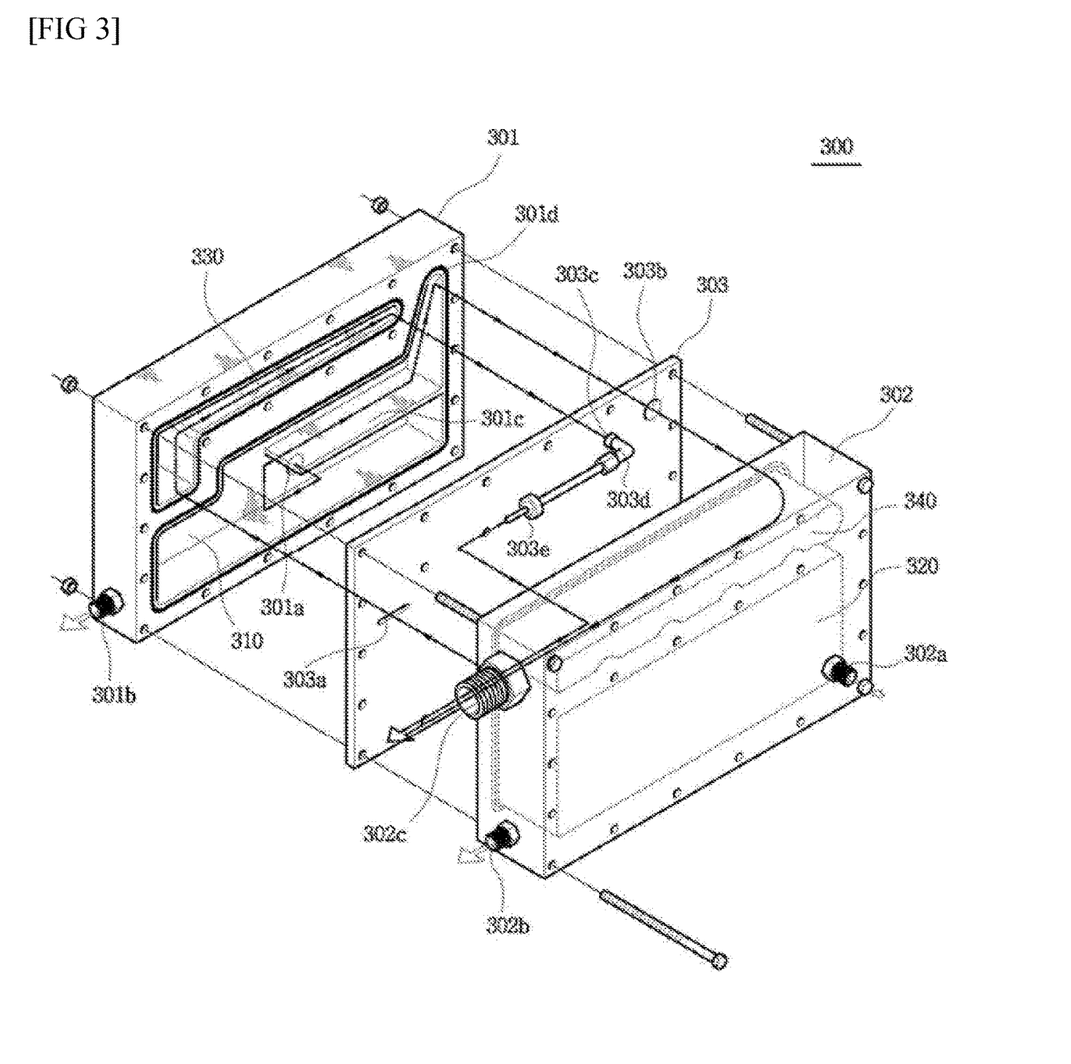
FIG. 3 is an exploded perspective view illustrating a hypochlorite generation part of FIG. 2.

FIG. 3 is an exploded perspective view illustrating the hypochlorite generation part of FIG. 2, and the hypochlorite generation part 300 will be described below with reference to FIG. 3.

The hypochlorite generation part 300 includes a configuration of the electrolysis tank for receiving and electrolyzing the diluted salt water and generating sodium hypochlorite (hereinafter, referred to as hypochlorite).

The hypochlorite generation part 300 is configured such that a first body 301 and a second body 302 are coupled to each other while a partition wall 303 being interposed therebetween, inner surfaces of the first body 301 and the second body 302, which face each other, are recessed to partition a plurality of separation spaces, and the spaces are communicated with each other through passages in a form of holes at specific locations of the partition wall 303, whereby flow paths for stages are formed.

The first body 301 secures space parts of the cooling tank 310 and the hydrogen separation tank 330 by recessing one side surface of a synthetic resin panel of a specific thickness inwards.

The cooling tank 310 is a site that directly receives the incoming water from the outside through a faucet line, and is partitioned on a lower side of the first body 301.

A source water injection hole 301a connected to an external incoming water line is formed on a wall surface of a lower portion of the cooling tank 310, and it is preferable that a location of the source water injection hole 301a is a central location of a lower portion of the cooling tank 310.

Furthermore, a drain hole 301b for draining water in an interior of the cooling tank 310 to the outside later is formed on one side of a bottom of the cooling tank 310.

Then, the incoming water supplied through the source water injection hole 301a flows to an upper point of the cooling tank 310 and flows toward the dilution tank 340, and the partition wall 303 installed between the cooling tank 310 and the dilution tank 340 has a second passage 303b that connects them.

Then, a pressure concentration phenomenon may be prevented by forming a plate-shaped water pressure dispersing rib 301c on an upper side of the source water injection hole 301a and causing a strong water pressure of the incoming water supplied through the faucet line to collide a water pressure dispersing rib 301c.

Further, the hydrogen separation tank 330 is formed at an upper portion of the cooling tank 310.

The hydrogen separation tank 330 is formed in an inverse L-shape including a vertical section and a horizontal section, and a lower portion of the vertical section is formed at a location of the second tank 302, which faces the electrolysis tank 320 to be communicated with the electrolysis tank 320, and the horizontal section is formed at a location of the second body 302, which faces the dilution tank 340 to be communicated with the dilution tank 340.

Then, the cooling tank 310 partitioned on a lower side of the hydrogen separation tank 330 forms a partition border surface corresponding to the inverse-L-shaped curve of the hydrogen separation tank 330, and a discharge part 301d extending to a location corresponding to a height of the horizontal section is formed on one side of the horizontal section of the hydrogen separation tank 330. Then, it is preferable that the form of the discharge part 301d has a funnel shape that becomes gradually narrower toward an upper side to guide the incoming water such that the incoming water is collected at one site.

Furthermore, the second body 302 secures space parts of the electrolysis tank 330 and the dilution tank 340 by recessing one side surface of a synthetic resin panel of a specific thickness inwards.

The electrolysis tank 320 is a space for receiving the saturated salt water from the salt water supply part 200 for electrolysis, and a plurality of electrode plates (not illustrated) for electrolysis are installed and form a rectangular box-shaped space.

The electrolysis tank 320 has a salt water injection hole 302a that receives the diluted salt water supplied from the salt water supply part 200, on one side of a lower portion thereof, and a hypochlorite discharge hole 302c, through which the salt water in an interior thereof is discharged, on one side of a bottom thereof.

Then, a total area of the electrolysis tank 320 corresponds to the cooling tank 310 and the partition wall 303 while the cooling tank 310 and the partition wall 303 being interposed therebetween and a partial upper section thereof overlaps the vertical section of the hydrogen separation tank 330, and a first passage 303a, through which the electrolyzed hypochlorite flows to the hydrogen separation tank 330, is formed by punching a hole in the partition wall 303 at a portion that overlaps the vertical section.

In a description of a general structure of the electrolysis tank 320, positive and negative electrode plates are alternately installed at a specific interval in an interior space of a frame having a rectangular shaper, and the diluted salt water of 2.8 to 3% is received through a salt water injection hole provided on one side to generate the hypochlorite through electrolysis thereof.

The generated hypochlorite flows to the hydrogen separation tank 330, and the hydrogen gas ($H_2$) generated in the electrolysis process in the hydrogen separation tank 330 is separated and discharged.

Then, the hydrogen gas ($H_2$) having a low specific gravity is connected at an upper portion of the hydrogen separation tank 330, and an upper end of the horizontal section of the hydrogen separation tank 330 is inclined such that the hydrogen gas is guided to be collected to an upper side of the inclined surface regardless of the flows of the hypochlorite.

In the present invention, an upper end of the horizontal section of the hydrogen separation tank 330 is gradually downwardly inclined from a section communicated with the electrolysis tank 320 toward a section communicated with the dilution tank 340, whereby the hydrogen gas may be guided to be collected at a distal end of the vertical section of the hydrogen separation tank 330 so as to be discharged to the outside, and a separate gas discharge part for discharging the hydrogen gas may be formed.

Furthermore, the dilution tank 340 that generates chlorine disinfectant of a desired ratio by mixing the sodium hypochlorite (hypochlorite) that has passed through the electrolysis tank 330 and the hydrogen separation tank 330 with the incoming water is formed at an upper portion of the electrolysis tank 320.

The dilution tank 340 forms a rectangular box-shaped space that extends from an upper portion of the electrolysis tank 320 lengthwise.

Then, a hypochlorite discharge hole 302c, through which the hypochlorite mixed with the incoming water to be diluted is finally discharged, is formed on one side of the dilution tank 340.

Then, an one side end area of the whole area of the dilution tank 340 overlaps the discharge part 301d of the cooling tank 310 and an end of the horizontal section of the hydrogen separation tank 330, a second passage 303b, through which the hypochlorite is introduced into the dilution tank 340, is formed by punching a hole in the partition wall at a portion that overlaps an end of the horizontal section of the hydrogen separation tank 330, and a third passage 303c, through which the cooling water is introduced into the dilution tank 340, is formed by punching a hole in the partition wall 303 at a portion that overlaps the discharge part 301d of the cooling tank 310.

Then, as the second passage 303b and the third passage 303c may be formed to be close to each other, the incoming water may reversely flow toward the hydrogen separation tank 330, to which the hypochlorite is supplied due to a pressure difference of the incoming water introduced into the dilution tank 340, and in order to prevent this, an elbow pipe 303d is installed in the third passage 303c, to which the hypochlorite is supplied, and a discharge end of the elbow pipe is made to face the hypochlorite discharge hole 302c, whereby the incoming water introduced through the second passage 303b may be prevented from flowing reversely.

A reverse flow preventing damper 303e may be further installed by extending a discharge end of the elbow pipe 303d, and the reverse flow preventing damper 303e functions as a check valve that basically interrupts the incoming water (source water) from being introduced into the hydrogen separation tank 330.

Furthermore, the reverse flow preventing damper 303e prevents the fluid from flowing reversely due to a pressure formed in the pipeline after the antiseptic solution generating apparatus, and functions as a pressure control means for smoothly resume an operation thereof when the apparatus is reused.

In a description of an operation of the hypochlorite generation part 300 according to the present invention, first, the salt water is supplied from the salt water supply part 200 to the electrolysis tank 320. Thereafter, the salt water that has undergone the electrolysis process in the electrolysis tank 320 generates the sodium hypochlorite (hypochlorite) of an effective chlorine concentration of 3100 to 800 ppm.

The high-concentration hypochlorite is separated from hydrogen gas via the hydrogen separation tank 330, and only the pure hypochlorite is supplied to the dilution tank 340.

Then, in the dilution tank 340, the hypochlorite that has undergone the hydrogen separation tank 330 and the incoming water introduced through the cooling tank 310 merges to be diluted at a suitable concentration, and then are used as chlorite disinfectant.

The dilution tank 340 may generate chlorine disinfectants of various concentrations depending on the flow rate of the incoming water and the flow rate of the hypochlorite.

For example, a chlorine disinfectant of a high concentration diluted to a concentration of 100 ppm to wash or disinfect hands, rags, dishcloths, or cutting boards, a chlorine disinfectant of a middle concentration diluted to a concentration of 50 ppm to wash meat or fish, and a chlorine disinfectant of a low concentration diluted to a concentration of 30 ppm to wash vegetables or fruits.

Furthermore, a temperature sensor "T" is installed at an inlet, through which the incoming water of the salt water supply part 200 is supplied.

The temperature sensor "T" measures a temperature of the incoming water and informs the CPU 510 of the measured value, and the CPU 510 determines the measured value of the temperature sensor "T" and determines that there is a danger of freezing and rupture when the measured value is a preset value or less and generates a warning alarm to the user.

In the drawings, the illustration of the alarm device is omitted.

In this way, the present invention allows the user to recognize a danger of freezing and rupture and prepare for the danger in advance, and thus may prevent a problem of not being able to use winter season apparatuses.

Furthermore, according to the present invention, the CPU 510 determines the value of the temperature sensor "T" to control a supply current of the electrolysis tank through a current control part 520 such that an electrolysis temperature of the hypochlorite generation part 300 is always maintained at a reference value.

For example, overcurrent may be prevented from being supplied into the electrolysis tank while causing a breakdown of a power supply device in advance because of a rise in the temperature of the incoming water due to a change of the temperature of the incoming water for seasons and global warming.

The present invention may generate sterilizing water of a uniform quality by constantly maintaining a change in a reaction temperature and an electrolysis current in the electrolysis tank and thus constantly maintaining a concentration of the sterilizing water.

Figure 4:
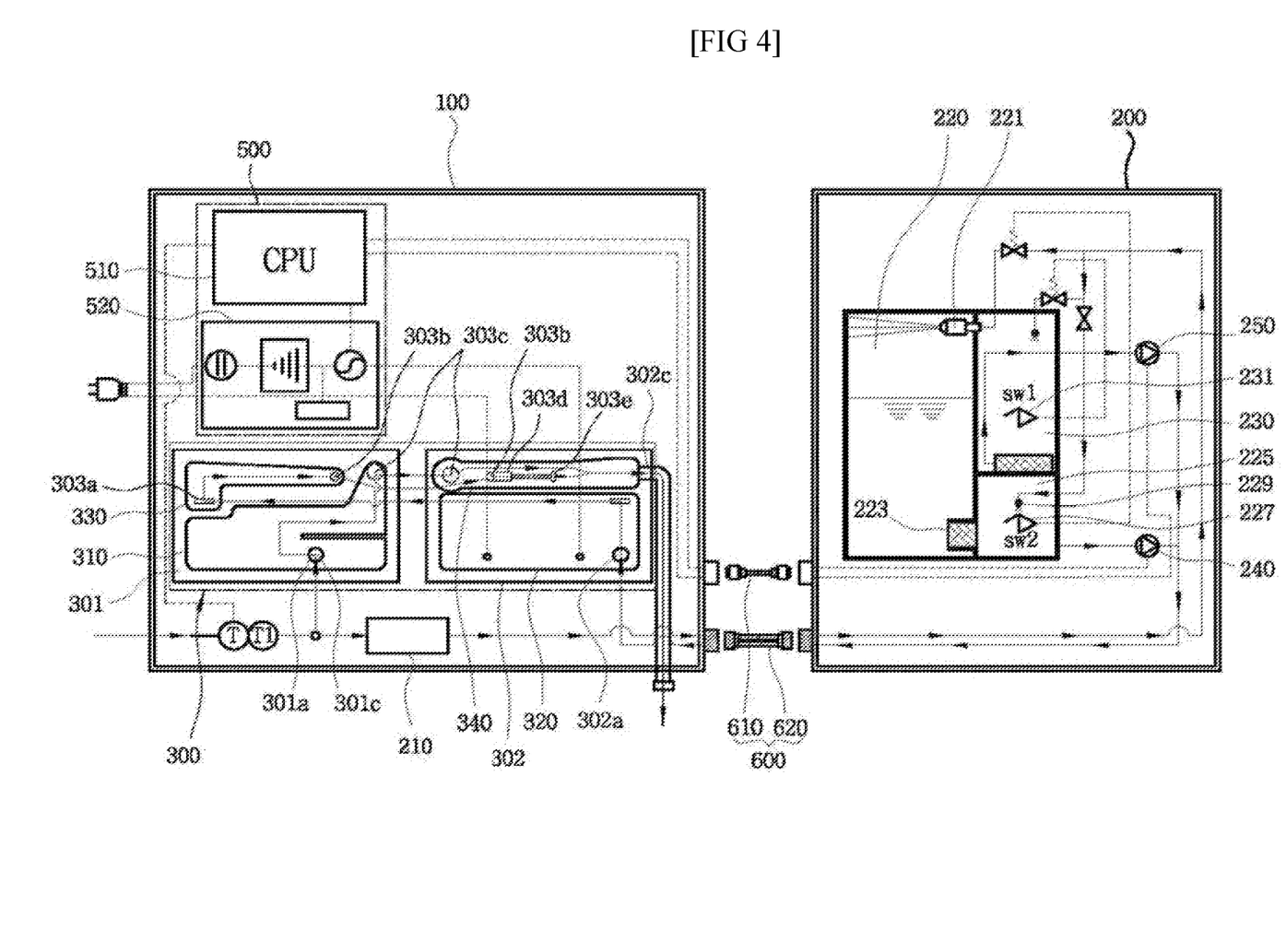
FIG. 4 is a schematic diagram of an apparatus for generating chlorine disinfectant according to another embodiment the present invention.

FIG. 4 is a schematic diagram of an apparatus for generating chlorine disinfectant according to another embodiment the present invention. Referring to FIG. 4, according to the present invention, after the salt water supply part 200 is independently formed in a separate case to be separable, it is connected to the body of the apparatus by a connection means 600 including a cable 610 and a hose 620.

As described above, the present invention may improve an electrolysis efficiency by stably supplying salt water of a high quality to the electrolysis tank through the salt water supply part.

Furthermore, according to the present invention, a large amount of the saturated salt may be supplied more stably by installing a separate saturated slat collecting part in the salt water supply part, and thus an antiseptic solution operation time and a work capacity may be improved.

Although the exemplary embodiments of the present invention have been described with reference to the accompanying drawings, it will be understood by those skilled in the art to which the present invention pertains that the present invention can be carried out in other detailed forms without changing the technical spirits and essential features thereof. For example, an ordinary person in the art may change materials and sizes of the elements according to the application fields or may combine or replace the embodiments to carry out the present invention in a form that is not clearly disclosed in the embodiments of the present invention, but the changes, combinations, or replacements also fall within the scope of the present invention. Therefore, the above-described embodiments are exemplary in all aspects and should not be understood as being restrictive, and the modified embodiments fall within the technical spirits described in the claims of the present invention.

[Description of Reference Numerals]

| | |
|---|---|
| 100: case | 200: salt water supply part |
| 210: bypass part | 220: dissolution tank |
| 221: incoming water ejection nozzle | 223: filter |
| 225: saturated salt collecting part | 227: salt water level switch |
| 229: cleaning water ejection nozzle | |
| 230: diluted water supply part | 231: diluted water level switch |
| 240: first pump | 250: second pump |
| 300: hypochlorite generation part | |
| 301: first body | 301a: source water injection hole |
| 301b: drain hole | 302: second body |
| 302a: salt water injection hole | 302b: drain hole |
| 302c: hypochlorite discharge hole | 303: partition wall |
| 303a: first passage | 303b: second passage |
| 303c: third passage | 303d: elbow pipe |
| 303e: reverse flow preventing damper | 310: cooling tank |
| 320: electrolysis tank | 330: hydrogen separation tank |
| 340: dilution tank | 500: control part |
| 510: CPU | 520: current control part |

The invention claimed is:

1. An apparatus for generating chlorine disinfectant, in which a salt water supply part (200) configured to generate diluted salt water by mixing incoming water at a specific ratio in a pipeline, to which saturated salt water is supplied, a hypochlorite generation part (300) configured to generate sodium hypochlorite by receiving and electrolyzing the diluted salt water, and generate chlorine disinfectant by mixing the sodium hypochlorite with the incoming water at a desired ratio, and a control part (500) configured to control the salt water supply part (200) and the hypochlorite generation part (300) are disposed in a single body case (100),
    wherein the salt water supply part (200) has a dissolution tank (220) and includes a saturated salt collection part (225) and a diluted water supply part (230) in a space on a side that is separated and partitioned from the dissolution tank (220), the saturated salt collection part (225) is formed at a lower portion thereof to be connected to a bottom of the dissolution tank (220), and the diluted water supply part (230) is formed at a saturated salt collection part (225) to be separated and partitioned therefrom, and
    wherein the hypochlorite generation part (300) is configured such that a first body (301) and a second body (302) are coupled to each other while a partition wall (303) being interposed therebetween, inner surfaces of the first body (301) and the second body (302), which face each other, are recessed to partition a plurality of separation spaces, and the spaces are communicated with each other through passages in a form of holes at specific locations of the partition wall (303).

2. The apparatus of claim 1, wherein an incoming water ejection nozzle (221) configured to eject the incoming water is formed at an upper portion of the dissolution tank (220), and the incoming water is ejected such that an ejection direction of the incoming water ejection nozzle (221) faces an inner wall surface of the upper portion of the dissolution tank (220).

3. The apparatus of claim 1, wherein a filter (223) is formed at an inlet of the saturated salt collection part (225) on the bottom of the dissolution tank (220).

4. The apparatus of claim 1, wherein a salt water level switch (227) is formed in the saturated salt collection part (225).

5. The apparatus of claim 4, wherein a cleaning water ejection nozzle (229) configured to remove salt is formed in the salt water level switch (227).

6. The apparatus of claim 1, wherein the saturated salt water in the saturated salt collection part (225) is fed by a first pump (240).

7. The apparatus of claim 1, wherein a diluted water level switch (231) is formed in the diluted water supply part (230).

8. The apparatus of claim 1, wherein the diluted water in the diluted water supply part (230) is fed to the hypochlorite generation part (300) by a second pump (250).

9. The apparatus of claim 1, wherein a temperature sensor (T) is installed at an inlet of the salt water supply part (200), into which the incoming water is supplied, the temperature sensor (T) measures a temperature of the incoming water and informs a CPU (510) of a measured value, and the CPU (510) determines that there is a danger of a freeze and burst when the measured value of the temperature sensor (T) is a preset value or less and generates a warning alarm.

10. The apparatus of claim 9, wherein the CPU (510) determines the value of the temperature sensor (T) and controls a supplied current of an electrolysis tank through a current control part (520) such that an electrolysis temperature of the hypochlorite generation part (300) is always maintained at a reference value.

11. The apparatus of claim 9, wherein the CPU (510) adjusts a mixing ratio of the saturated salt water and the diluted water by controlling the first pump (240) and the second pump (250).

12. The apparatus of claim 1, wherein the salt water supply part (200) further has a bypass part (210) configured to allow a flow of the incoming water to detour on an outer side of a case (100), at a front end thereof.

13. The apparatus of claim 1, wherein the first body (301) has a cooling tank (310), to which the incoming water is directly supplied, and a hydrogen separation tank (330) at an upper portion of the cooling tank (310), and the second body (302) has an electrolysis tank (320) configured to receive the saturated salt water from the salt water supply part (200) for electrolysis, and a dilution tank (340) configured to generate the chlorine disinfectant of a desired ratio by mixing the sodium hypochlorite that has passed through the electrolysis tank (320) and the hydrogen separation tank (330), at an upper portion of the electrolysis tank (320), while the partition wall (303) interposed therebetween.

14. The apparatus of claim 13, wherein a source water injection hole (301a) connected to an external incoming water line is formed on a lower portion of a wall surface of the cooling tank (310), a drain hole (301b), through which water in an interior of the cooling tank (310) is discharged to an outside later, is formed on one side of a bottom of the cooling tank (310), a plate-shaped water pressure dispersing rib (301c) is formed on an upper side of the source water injection hole (301a), and a discharge part (301d) in a form of a funnel that becomes gradually narrower to an upper side is formed on one side of an upper portion of the cooling tank (310).

15. The apparatus of claim 13, wherein the hydrogen separation tank (330) has an inverse "L" shape including a vertical section and a horizontal section, a lower portion of the vertical section is formed at a location of the second body (302), which is communicated with the electrolysis tank (320), the horizontal section is formed at a location of the second body (302), which is communicated with the dilution tank (340), and an upper end of the horizontal section has an inclined surface that is gradually downwardly inclined to a distal end thereof.

16. The apparatus of claim 15, wherein a gas discharge part configured to guide hydrogen gas such that the hydrogen gas is collected at a distal end of the vertical section of the hydrogen separation tank (330) and discharge the collected hydrogen gas is formed by forming an upper end of the horizontal section of the hydrogen separation tank (330) such that the upper end of the horizontal section of the hydrogen separation tank (330) is gradually downwardly inclined from a section communicated with the electrolysis tank (320) toward a section communicated with the dilution tank (340).

17. The apparatus of claim 13, wherein the electrolysis tank (320) has a salt water injection hole (302a) configured to receive the diluted salt water supplied from the salt water supply part (200), on one side of a lower portion thereof, and a hypochlorite discharge hole (302c), through which the salt water in an interior thereof is discharged, on one side of a bottom thereof.

18. The apparatus of claim 13, wherein a hypochlorite discharge hole (302c), through which the hypochlorite mixed with the incoming water and diluted is finally discharged, is formed on one side of the dilution tank (340), a second passage (303b) that allows the hypochlorite is introduced into the dilution tank (340) is formed by punching a hole in the partition wall (303) at a portion of the hydrogen separation tank (330), which overlaps an end of the horizontal section, a third passage (303c) that allows cooling water to be introduced into the dilution tank (340) by punching a hole in the partition wall (303) at a portion of the cooling tank (310), which overlaps the discharge part (301d), an elbow pipe (303d) is installed in the third passage (303c), through which the hypochlorite is supplied, and a discharge end of the elbow pipe faces the hypochlorite discharge hole (302c).

19. The apparatus of claim 18, further comprising:
a reverse flow preventing damper (303e) formed by extending the discharge end of the elbow pipe (303d).

* * * * *